July 7, 1953 H. KAMPLADE 2,644,387
PARALLELOGRAM MOUNTED CARRIER FOR CULTIVATOR TOOLS
Filed April 17, 1952 2 Sheets-Sheet 1

INVENTOR:
HEINRICH KAMPLADE
BY:
Haseltine, Lake & Co.
AGENTS

July 7, 1953  H. KAMPLADE  2,644,387
PARALLELOGRAM MOUNTED CARRIER FOR CULTIVATOR TOOLS
Filed April 17, 1952  2 Sheets-Sheet 2

INVENTOR:
HEINRICH KAMPLADE
By:
Haseltine, Lake & Co.
AGENTS

Patented July 7, 1953

2,644,387

UNITED STATES PATENT OFFICE 2,644,387

PARALLELOGRAM MOUNTED CARRIER FOR CULTIVATOR TOOLS

Heinrich Kamplade, Windsheim, Germany, assignor to Maschinenfabrik Schmotzer G. m. b. H., Windsheim, Bavaria, Germany, a company of Germany Application April 17, 1952, Serial No. 282,780 In Germany February 26, 1951

3 Claims. (Cl. 97—198.1)

The invention relates to cultivators to be drawn by teams or tractors. The purpose of the invention consists in the provision of simple means for rendering such machines highly versatile.

For this purpose, e. g., in digging and covering planting-holes, the parallelogram frames for the hoeing tools have hitherto been exchanged for the required special tools, which procedure is troublesome and costly. This disadvantage is eliminated, pursuant to the invention, by the provision of a multiple-purpose parallelogram which, after changing the tools, can be very advantageously used for all required further operations as, e. g., for digging, covering and hilling of planting holes.

The new parallelogram differs from known designs, pursuant to the invention, in that a frame in the form of a parallelogram is provided, having horizontal and vertical openings at least at the front and rear ends, serving for the attachment of different tools, such that the interchange, or attachment and detachment, of such tools, is accomplished simply by means of a setscrew. In this way a single parallelogram, depending on the number and spacing of the rows, can be fitted simultaneously with one, two or three blades, or these blades can be quickly exchanged for other working tools, e. g., for digging, covering and hilling of planting-holes.

This parallelogram tool-frame, with front and rear points of attachment, may be a welded assembly or a single steel or malleable iron casting, and is characterized by two wide pivot-lugs about halfway between the two points of attachment, to receive the top and bottom crosspieces, thus maintaining parallelism.

These especially wide channel crosspieces impart a high lateral rigidity to the parallelogram, so that it is possible to mount two digger wheels on it simultaneously. In this case it is desirable to omit the gauge wheel, which pursuant to the invention is therefore removably mounted on the frame, the lower channel cross-piece or link being curved downwardly and having an elongated opening to receive the gauge wheel upright.

Another novel feature of the invention is the combination of two covering-discs to form a disc hiller, with both discs working outward and their common support mounted on a bent shaft provided with a holder for attachment to the parallelogram. This disc hiller operates entirely without clogging; it runs in mid-furrow and thus clears the plant rows. Pursuant to the invention, a blade placed between the discs serves to free the furrow and prevent the damage to the soil due to dispersion that would otherwise occur.

The combination of the hiller mounted on the parallelogram with the gauge wheel to regulate the draft is likewise novel and ensures a satisfactory hilling action that has hitherto not been obtainable with the resulting degree of perfection.

The accompanying drawing represents various examples of embodiment of the idea of the invention, each figure showing an elevation and corresponding top view.

Figure 1:
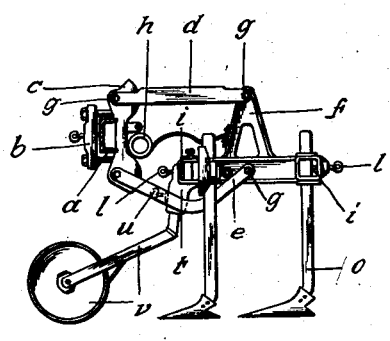
Figure 1 is a side elevation of the multiple-purpose parallelogram, equipped with three hoe blades.

The draw bar $a$ of the cultivator is fitted with several parallelograms, according to width and number of rows, by means of screw clamps $b$. The vertical link $c$ is jointed to an upper link $d$ and a lower link $e$, which at their opposite ends carry a tool holder $f$ to form the parallelogram. The jointed connection is effected by means of four bolts $g$, a spring $h$ fixed to the vertical link $c$ serving to place additional pressure on the tool holder $f$. The tool holder $f$, comprises a substantially triangular upright member mounted upon a horizontal member for attachment of various tools. The horizontal member has front and rear points of attachment with intersecting horizontal and vertical openings $i$ and $k$, a setscrew $l$ serving for attachment of the tools. Thus e. g. in the example of Figure 1, two adjustable blade holders $m$ with blades $n$ are mounted in front and a center blade holder $o$ in the rear.

Figure 2:
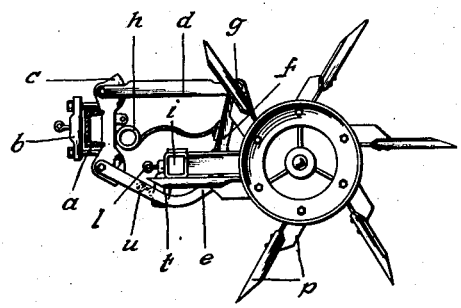
Figure 2 is a side elevation of the same machine with a planting-hole digger attachment.
Figures 5, 6:
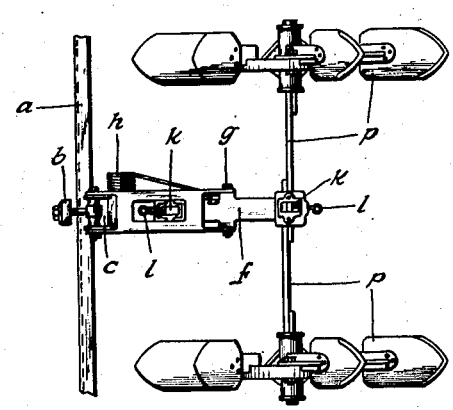
Figures 5–8 are plan views of the embodiments shown in Figures 1–4 respectively.
Figure 3:
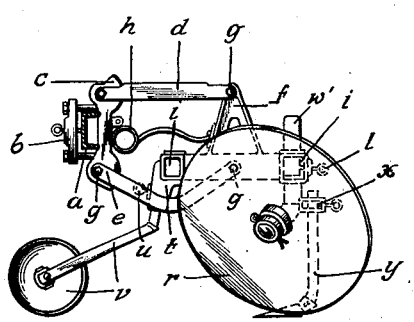
Figure 3 is a side elevation of the machine with combined disc hiller and furrow blade.
Figure 4:
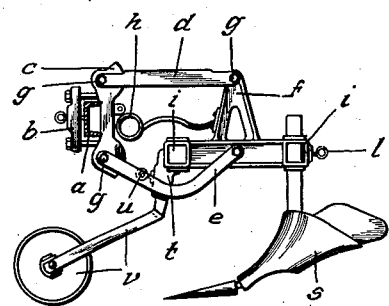
Figure 4 is a side elevation of the machine with a hilling attachment and gauge wheel (depth hiller).
Figure 7:
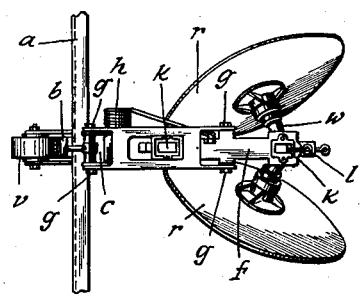
Figure 8:
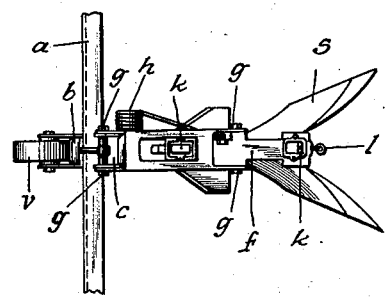

In the example of Figure 2, the rear point of attachment $i$ receives two adjustable digger wheels $p$, while in that of Figure 3 a "disc hiller" $r$ is attached in the rear by means of a setscrew $l$. A hiller attachment $s$ is similarly attached in the example of Figure 4.

A gauge-wheel fork $t$ attached to the front end of the tool holder holds the gauge wheel $v$ by means of an easily loosened setscrew $u$, permitting removal when required, as shown in Figure 2.

The disc hiller $r$, as well as the hiller attachment s, is vertically adjustable with respect to the gauge wheel v. The hiller discs of Figure 3 are mounted on a common bent shaft w provided with a holder w' vertically adjustable in the vertical hole k of the rear point of attachment and attachable by means of setscrew l. On this common shaft w, provided with a clamp x, a vertically adjustable furrow blade y is mounted.

In all of the combinations of Figures 1, 2, 3 and 4, notwithstanding the comparative length of the crosspieces, the compact design so essential in convertible cultivators is notably preserved.

I claim:

1. A multiple-purpose tool holder for a mobile farming implement comprising a frame of substantially parallelogram form disposed in a vertical plane, said frame having a forward vertical link, an upper horizontal link, a lower substantially horizontal link, said horizontal links being connected to a rear vertical link that includes a horizontal member, said horizontal member extending forwardly and rearwardly from its point of attachment to said lower horizontal link, said horizontal member having ends with intersecting horizontal and vertical openings therein, said openings serving as points of attachment for exchangeable tools, and means for adjustably securing said tools in said openings.

2. A multiple-purpose tool holder as set forth in claim 1 wherein such forwardly extending portion of the horizontal member lies between said upper and lower horizontal links.

3. A multiple-purpose tool holder as set forth in claim 1 wherein a pair of covering discs are mounted on a common bent shaft, said bent shaft being secured to a holder rising vertically therefrom and said holder being mounted in the opening at the rear end of said horizontal member, and a furrow blade disposed between said covering discs and mounted on a shaft secured to said bent shaft.

HEINRICH KAMPLADE.

References Cited in the file of this patent

UNITED STATES PATENTS

| Number | Name | Date |
| --- | --- | --- |
| 576,877 | Miller | Feb. 9, 1897 |
| 2,383,022 | Strandlund | Aug. 21, 1945 |
| 2,522,702 | Charley | Sept. 19, 1950 |

FOREIGN PATENTS

| Number | Country | Date |
| --- | --- | --- |
| 99,703 | Austria | Apr. 25, 1925 |
| 111,056 | Austria | Oct. 25, 1928 |
| 398,893 | Germany | July 24, 1924 |
| 535,300 | Germany | Oct. 8, 1931 |
| 688,710 | France | May 19, 1930 |